Figure 1:
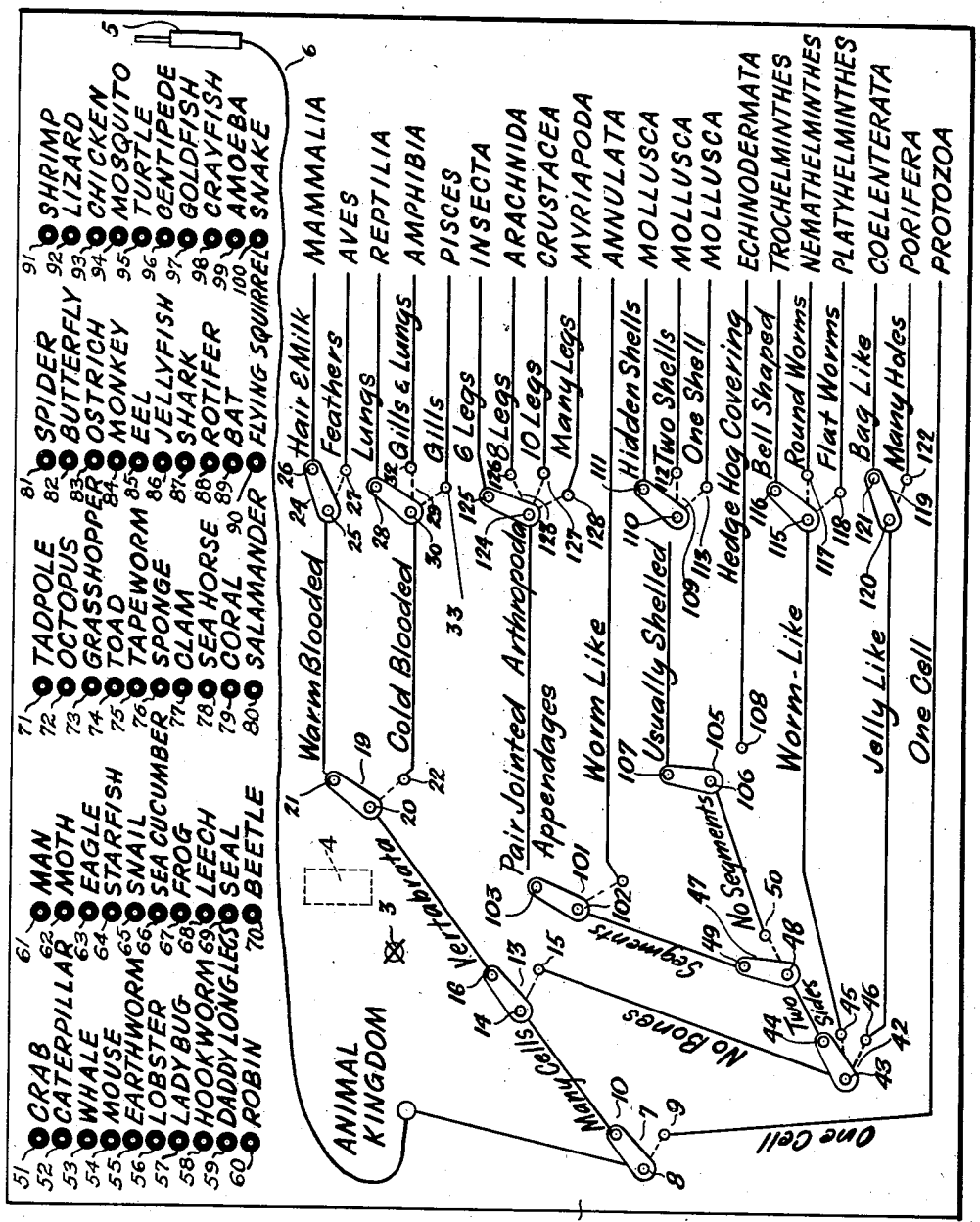

June 27, 1944.  M. L. BROWN  2,352,182
EDUCATIONAL APPARATUS
Filed March 2, 1942  2 Sheets-Sheet 1

Inventor
Myrl L. Brown
by
Attorney

June 27, 1944.  M. L. BROWN  2,352,182
EDUCATIONAL APPARATUS
Filed March 2, 1942    2 Sheets-Sheet 2
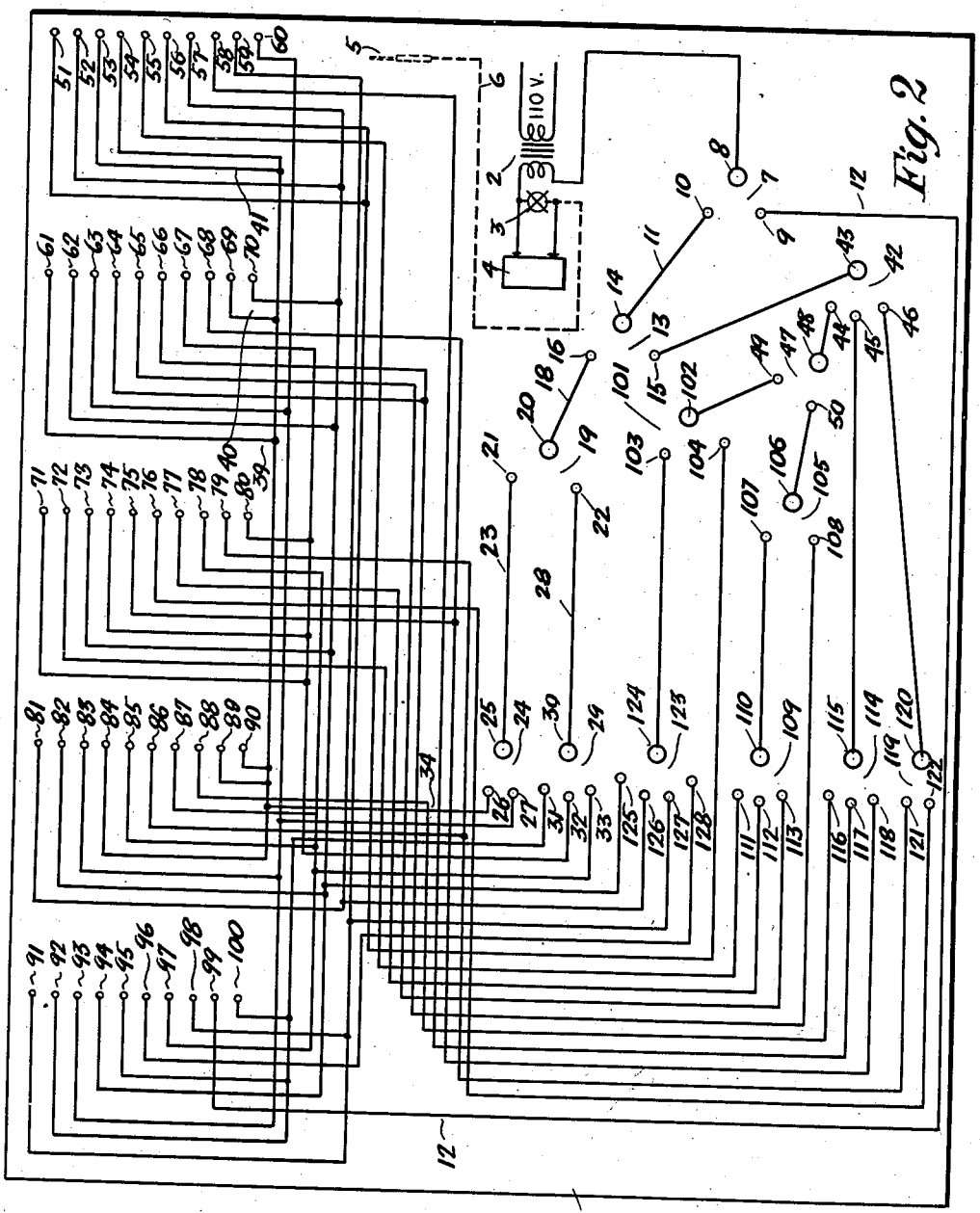
Inventor
Myrl L. Brown Patented June 27, 1944

2,352,182

UNITED STATES PATENT OFFICE 2,352,182

EDUCATIONAL APPARATUS

Myrl L. Brown, Harrisburg, Pa., assignor to Cambosco Scientific Company, Boston, Mass., a corporation of Massachusetts Application March 2, 1942, Serial No. 433,003

6 Claims. (Cl. 35—20)

The present invention relates to educational apparatus and particularly to a device which furnishes a visual aid to education.

An object of the present invention is to provide a device which is useful, especially in schools, as a visual aid in the teaching of nomenclature and classification, particularly of things found to be related to each other in groups susceptible of subdivision into smaller groups of differing characteristics. As such, my invention is especially well adapted for use in the teaching of such subjects as biology, botany and zoölogy for example.

Another object of my invention is to provide a device which will attract and hold the attention of students engaged in the study of classifications and which will give students practice in classifying particular objects in accordance with established and generally accepted principles.

The above and other objects of my invention will best be understood from the following description taken in connection with the accompanying drawings in which Figure 1 is a diagrammatic plan view of a representative form of my invention showing a portion of the electrical circuits involved; Figure 2 is a view of the bottom of the member 12 in Figure 1 showing diagrammatically the complete wiring diagram of the electrical circuits in the illustrated form of my invention; and Figure 3 is a partial wiring diagram of a modification of my invention.

The illustrated embodiment of my invention shows its application to the teaching of zoölogy, and particularly to the teaching of the classification of members of the animal kingdom into the generally established and accepted phyla. In general my invention consists of a plurality of electrical circuits selectable one at a time, each of said circuits having a plurality of branches and/or sub-branches selectable one at a time to form a single series circuit containing a source of electric current and an indicating device.

As shown in the drawings, a base member 1 is provided upon which most or all of the other elements of the invention may be mounted. The base member 1 may be a board or other suitable support, and it may, if desired, form the top of a box enclosing the structures beneath, or it may be mounted in any other desired fashion. Beneath the base 1 is mounted a source of electric power such as the transformer 2 having a primary winding connectible to suitable mains; alternatively a dry battery may be used. The secondary of the transformer is connectible by a series of switch devices into a series circuit including an indicating device such as a lamp 3 and/or an alarm 4, either or both of which may be placed above the base 1; as shown, however, only the lamp 3 is visible from the top of member 1, the alarm being concealed beneath.

Also mounted on the base 1 are a plurality of jacks, fifty being shown on the drawings numbered 51 to 100 respectively. These are adapted to receive and make contact with a selector plug 5, connected by a flexible lead 6 to one set of terminals of the indicators 3 and 4, the remaining set of terminals of the indicators being connected to one terminal of the secondary of transformer 2.

A plurality of single pole multi-position switches are also mounted on the base 1. These are preferably of the type having a movable contact arm adapted to make contact with two or more stationary studs. The switches are preferably mounted on the base 1, so that both the arms and the contact studs are invisible from the top of the base and so that the switches can readily be operated from the top. Groups of these switches are connected in series with each other to form a plurality of selectable branched series electrical paths as will more fully appear below.

In the embodiment illustrated, the first of these switches is a two-position switch 7 having a movable contact arm 8 and two contact studs 9 and 10. One branch circuit is connected to stud 9 and another to stud 10. The circuit from stud 9 leads by way of conductor 12 to the jack 99. With switch arm 8 on stud 9, if plug 5 be inserted in jack 99, the circuit will be completed thru flexible lead 6 to the indicators, secondary of transformer 2 and back to switch arm 8, so that the lamp 3 will be lighted and the alarm 4 sounded. With switch arm 8 on contact 9, no other position of plug 5 will complete a circuit.

The circuit from stud 9 leads by way of conductor 11 to a second two-position switch 13 having arm 14 and studs 15 and 16. Thus, here another branch occurs in the circuit, the operator having the option of selecting either the path from stud 16 and conductor 18 or the path from stud 15 and conductor 17. Considering the former first, conductor 18 leads to a third two-position switch 19 having contact arm 20 and studs 21 and 22, thus providing a still further branching of this circuit. Stud 21 leads by way of conductor 23 to still another two-position switch 24 having arm 25 and studs 26 and 27, while stud 22 leads by way of conductor 28 to a three-position switch 29 having arm 30 and studs 31, 32 and 33. Stud 26 of switch 24 is connected by conductors 34 and 35 to jack 84; by conductors 34, 38 and 36 to jack 89; by conductors 34, 38 and 37 to jack 90; by conductors 34, 38 and 39 to jack 61; by conductors 34, 38 and 40 to jack 69; and by conductors 34, 38 and 41 to jack 53. Thus with arm 8 on stud 10, arm 14 on stud 16, arm 20 on stud 21 and arm 25 on stud 26, a circuit is completed through the power source and the indicators 3 and 4 if the plug 5 be inserted in any one of jacks 99, 84, 89, 90, 61, 69 or 53.

Similarly, stud 27 of switch 24 is connected to jacks 93, 83, 63 and 60, so that with arm 25 on stud 27 a complete circuit through the indicators will be formed when plug 5 is inserted in any of jacks 93, 83, 63 or 60, the other switch arms being in the positions mentioned in the preceding paragraph.

Now going back to switch 19, the stud 22 as above stated leads to switch 29 which has three positions providing three selectable branches in the circuit. Stud 31 is connected to jacks 92, 95 and 100; stud 32 to jacks 71, 74, 80 and 67; and stud 33 to jacks 97, 85, 87 and 78. This completes all the branch circuits from stud 16 of switch 13.

When arm 14 of switch 13 is in contact with stud 15, a different series of branch circuits is obtained, leading thru different jacks. Stud 15 is directly connected to arm 43 of three-position switch 42 having studs 44, 45, and 46. Stud 46 is connected to arm 120 of two-position switch 119 having stud 122 leading to jack 76 and stud 121 leading to jacks 86 and 79. Stud 45 of switch 42 is connected to arm 115 of three-position switch 114 having studs 116, 117 and 118. Stud 118 leads to jacks 75 and 68; stud 117 leads to jack 58 and stud 116 leads to jack 88.

Similarly, stud 44 of switch 42 is connected to arm 48 of two-position switch 47 having stud 49 connected to switch 101 and stud 50 connected to switch 105. The latter is a two-position switch having studs 107 and 108. Stud 108 is connected directly to jacks 64 and 66, while stud 107 is connected to three-position switch 109, having studs 111 connected to jack 72, 112 connected to jack 77, and 113 connected to jack 65.

Finally, switch 101 has two positions represented by studs 103 and 104. Stud 104 is directly connected to jack 55 while stud 103 is connected to arm 124 of four-position switch 123 having stud 125 leading to jacks 94, 82, 73, 62, 70, 52 and 57; stud 126 leading to jacks 81 and 59; stud 127 leading to jacks 91, 98, 51 and 56; and stud 128 leading to jack 96.

The manner in which these various branch path circuits are utilized will now be evident from Figure 1. The several jacks are each labelled with the name of a particular species whose classification is to be made. In the present embodiment, the names of animals are used, for this embodiment is arranged for the classification of members of the animal kingdom in their proper phyla.

The several paths between the various switches are each labelled with one of the characteristics by which the members of the several phyla are distinguished. Thus, the two paths immediately leading from switch 7 are labelled "Many cells" and "One cell" respectively. Since all one-celled animals are grouped in a single phylum termed "Protozoa," no further sub-division of this path is required.

The ultimate studs of the switches which are directly connected to jacks are labelled with the various phyla in which the animals listed are ultimately classified. The paths between the switches are preferably marked on the top of the base 1 by lines inscribed on the base as shown in Figure 1, so that the student operating the device can follow the paths. The switch arms themselves show which path is being selected. At the ultimate ends of the various lines, the names of the various phyla will then appear.

Referring again to switch 7, the path from stud 9 is labelled "One-cell." Since all one-celled animals are grouped in a single phylum termed "Protozoa," no further subdivision of this path is required and the line from stud 9 leads directly to the phylum designation "Protozoa." It will be recalled that jack 99 is directly connected with stud 9. Hence, placing the plug 5 in the jack 99 labelled "Amoeba," the animal amoeba is readily classified in its correct phylum, Protozoa, if the student is cognizant of the fact that the amoeba has not many cells, but only one cell and places arm 8 on stud 9, for then lamp 3 will light and alarm 4 sound.

The many-celled animals, however, are subdivided into vertebrates and those without bones as represented by the two branch paths leading from switch 13. The vertebrates may be warm-blooded or cold-blooded, hence another two-position switch 19 with two appropriately labelled paths is provided. Again, warm-blooded animals are divided into two groups, viz., those having hair and milk and those having feathers, representing the two great phyla of animal life, mammals and birds, respectively. Hence, the last switch 24 in this path has two positions connected to the various jacks labelled with the names of mammals and birds. With the plug 5 placed in any one of these jacks the indicators will be operated if the switches 7, 3, 19 and 24 are placed in the proper positions to complete the path to the correct phylum.

Similarly, to classify "spider," the plug 5 is placed in jack 81 which is so labelled, and the student must have observed and know, and indicate his knowledge by the proper operation of the switches, that spiders have many cells, no bones, two sides, a segmented body, with jointed legs, eight in number to arrive at the correct classification "Arachnida" evidenced by the lighting of lamp 3 and ringing of alarm bell 4.

It will be obvious that other designations than those shown in Figure 1 may be given to the various jacks, taking care, however, that the jacks in question lead to the ultimate switch studs which are labelled with the correct phylum. To this end, the designations labelling the jacks may be printed on cards adapted to be held in suitable frames or the like in the proper positions adjacent to jacks. Various different sets of cards may then be prepared for each individual jack or each group of ten jacks to provide more extended practice in classification.

If more representatives of a given phylum are desired, additional jacks connected to the proper ultimate switch studs may be provided.

It will also be evident that instead of using my invention for the classification of animals, it may be used for the classifications of plants or other things by providing the necessary number of branch paths selectable by switches having the necessary number of positions and by suitably labelling the paths between the switches, the ultimate contact studs and the jacks.

Moreover, instead of using the invention for the classification of individuals into phyla, it can also be used for the classification of individuals of one phylum into its species, and so on.

The modification above described requires a flexible lead 6 to be connected to the plug 5. This can be avoided by using the modified circuit shown in Figure 3. Here the secondary of transformer 2 has one terminal connected to the indicators 3 and 4, as in the previous modification, while the other terminal of the secondary is connected to a common conductor 130. Each of the jacks 51 to 100 (of which only ten, 51–60 are shown) have two normally open contacts adapted to be closed by insertion of a plug into the jacks. One contact of each jack is connected to the common conductor 130, while the other contact is connected to one of the ultimate switch studs as in Figure 2. The free terminals of the indicators 3 and 4 are connected to the arm 8 of the first switch 7. The remainder of the circuit is identical with that shown in Figure 2. Since the plug now need serve only to close the jack contacts, no leads of any kind need be connected to it. It will also be evident that in place of using a separate plug to close the jack contacts, other devices such as suitable types of push-button switches may be used in place of the jacks and plug, preferably interlocked push-button selector switches arranged so that only one of the contacts 51 to 100 can be closed at a time.

Having now described my invention, I claim:

1. An educational device for teaching the classification of individual members of a group into sub-groups whose members have similar characteristics, said device comprising a base having indicia thereon adapted to represent individual members of the group, electric circuit contacts mounted on said base and operatively located adjacent each of said indicia, further indicia adapted to represent said group as a whole, still further indicia adapted to represent said sub-groups, a plurality of branched linear representations connecting said group indicia with said sub-group indicia, electric circuit interrupters mounted on said base at the branches of said linear representations, an electrically operated indicator, a power source therefor, and electric circuit means interconnecting said contacts, circuit interrupters, indicator and power source, forming a plurality of partially different electric circuits selectively completed through a selected one of said contacts and those of said circuit interrupters which are located along the linear representations leading from said group indicia to the proper sub-group indicia into which the individual member represented by the indicia opposite said selected one of said contacts is to be classified.

2. An educational device as in claim 1 in which the circuit interrupters are lever type single pole switches whose levers are adapted to form parts of said linear representations.

3. An educational device as in claim 1, in which said contacts comprise a plurality of jacks mounted on said base and said circuit means include a movable plug member having a flexible cable connected thereto and being adapted to fit each of said jacks.

4. An educational device as in claim 1 in which the electric circuit means which connect said circuit interrupters into said electric circuit include conductors which are connected to the interrupters according to said linear representations.

5. An educational device as in claim 1 in which still further indicia adapted to represent common characteristics of members of said sub-groups are inscribed on said base adjacent said linear representations.

6. An educational device for teaching the classification of individual members of a group into sub-groups whose members have similar characteristics, said device comprising a base, a plurality of electric circuit contacts mounted on said base, a tree-like group of branched linear representations on said base, electric circuit interrupters mounted on said base at the branches of said linear representations, an electrically operated indicator, a power source therefor and electric circuit means interconnecting said contacts, circuit interrupters, indicator and power source forming a plurality of partially different electric circuits selectively completed through a selected one of said contacts and those of said circuit interrupters which are located between the trunk and the end of one of the branches of the tree-like linear representations.

MYRL L. BROWN.